F. W. GODFREY.
DIRECTION INDICATOR.
APPLICATION FILED APR. 7, 1919.
1,326,722.  Patented Dec. 30, 1919.
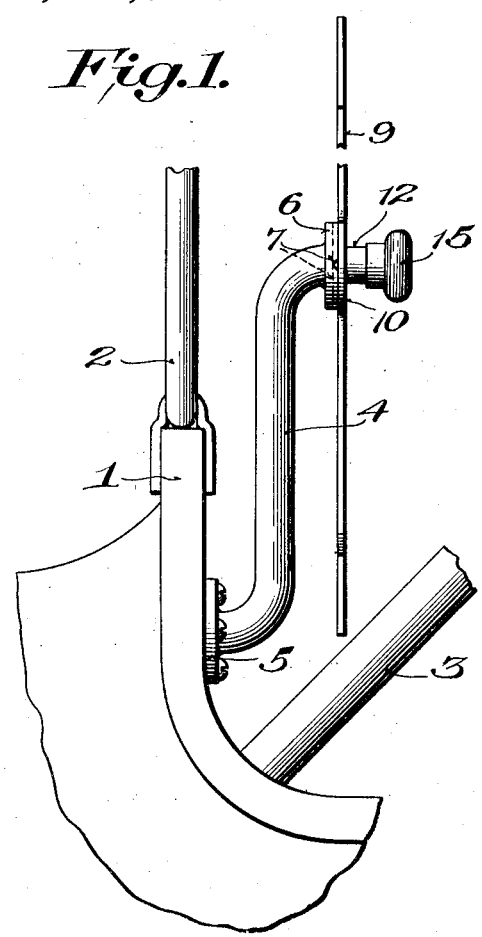
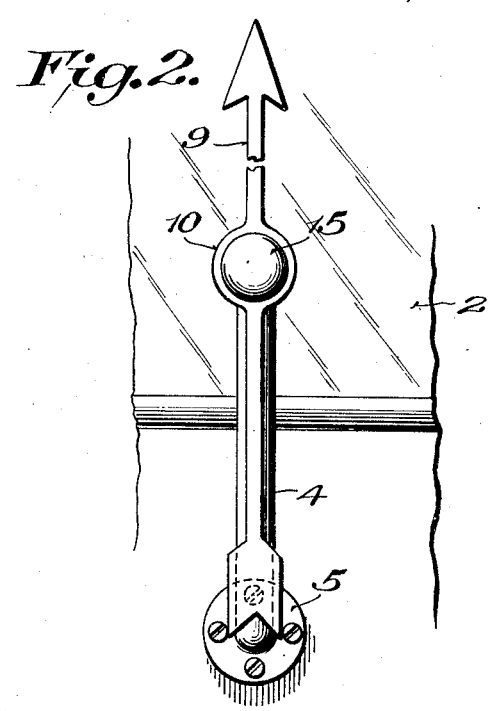
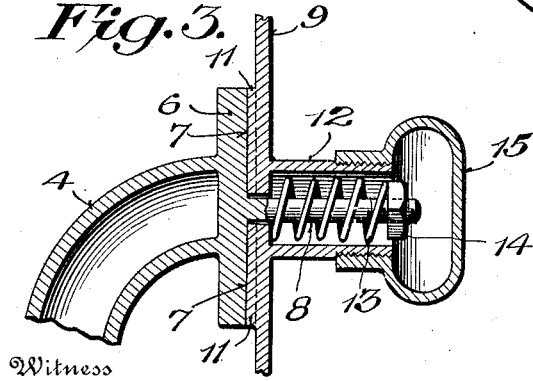
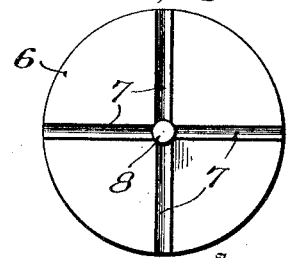
Witness
Chas. L. Griesbauer
Inventor
F. W. Godfrey,
By E. B. McBath
Attorney

UNITED STATES PATENT OFFICE.

FRANK W. GODFREY, OF PORTLAND, OREGON.

DIRECTION-INDICATOR.

1,326,722.　　　Specification of Letters Patent.　　Patented Dec. 30, 1919.

Application filed April 7, 1919. Serial No. 288,050.

*To all whom it may concern:*

Be it known that I, FRANK W. GODFREY, a citizen of the United States, residing at 50 N. 6th St., Portland, in the county of Multnomah and the State of Oregon, have invented certain new and useful Improvements in Direction-Indicators, of which the following is a specification.

This invention relates to a direction indicator adapted especially for the use of autoists and which can be readily fitted to any make of automobile.

The object of the invention is to signal to pedestrians the intention of the driver at crossings, that is as to whether he intends to drive straight ahead or turn to the left or right. The signal is in the form of an arrow, which in a vertical position signifies straight ahead, and when in a horizontal position indicates a turn in the direction pointed to by the arrow, either to the right or to the left.

The invention consists in the manner of mounting the arrow, the means for rotating it, and for locking it in adjusted position.

In the accompanying drawings:

Figure 1 is a side elevation of the device attached to the front of an automobile.

Fig. 2 is a rear elevation of the device, attached.

Fig. 3 is a longitudinal section through the operating handle and a portion of the support.

Fig. 4 is a view of the inner face of the arrow hub.

Fig. 5 is a face view of the upper end of the arrow support.

In these drawings 1 designates the front or dashboard of an automobile and 2 the wind-shield. A portion of the steering post 3 is also shown. My indicator comprises a tubular support 4, which may be fastened to the automobile in any desired manner, according to the shape given the lower portion of the support, and the particular part of the machine to which it is to be secured.

In some makes of automobiles it might be best to attach it directly to the steering post, but in the form shown I have illustrated it as secured to the inner face of the dash-board to one side of the steering post.

In this form the lower end of the support is curved forwardly and flanged as at 5 and then bolted in place.

The upper end, in all forms, curves rearwardly toward the driver's seat, not shown, and terminates in a solid cap or flange 6. The outer face of this cap has intersecting V-shaped grooves 7 and a center projecting post 8, the formation of the grooves being clearly shown in Fig 5.

The arrow 9 has a central perforated hub portion 10 provided with two radially extending V-shaped ribs 11 in alinement with each other. These are adapted to engage with either the vertical or horizontal grooves 7 of the cap.

The hub on the face opposite the ribs carries a sleeve 12 through which extends the post 8. A coil spring 13 fitted within the sleeve surrounds the post and bears at one end on the hub and at the opposite end on a nut 14 carried by the post 8. A pin passed through the post would be the equivalent of said nut as it is designed only to form a bearing for the outer end of the spring. A knob 15 is carried by the sleeve, and said knob and sleeve form the operating handle of the device.

Normally the spring holds the ribs 11 in one set of grooves. To shift the arrow from one position to the other the operator draws the knob toward him, thus disengaging the ribs and grooves, and then gives it a quarter turn. When released the spring forces the hub into locking engagement with the other set of grooves. The device being locked is not therefore shifted out of position by vibration of the car.

What I claim is:—

In a device of the kind described, a support having an upper end portion the outer face of which is provided with two sets of intersecting grooves, a post extending from the support at the intersection of said grooves, an arrow having a hub portion, ribs thereon adapted to engage either set of grooves, a sleeve on the hub and extending from the face opposite said ribs, the post of the support extending through said sleeve, a knob on the sleeve, a spring within the sleeve and coiled about the post, the inner end of the spring bearing on the hub of the arrow, and a bearing carried by the outer end portion of the post against which the outer end of the spring bears.

In testimony whereof I have affixed my signature.

FRANK W. GODFREY.